United States Patent Office 3,147,385
Patented Sept. 1, 1964

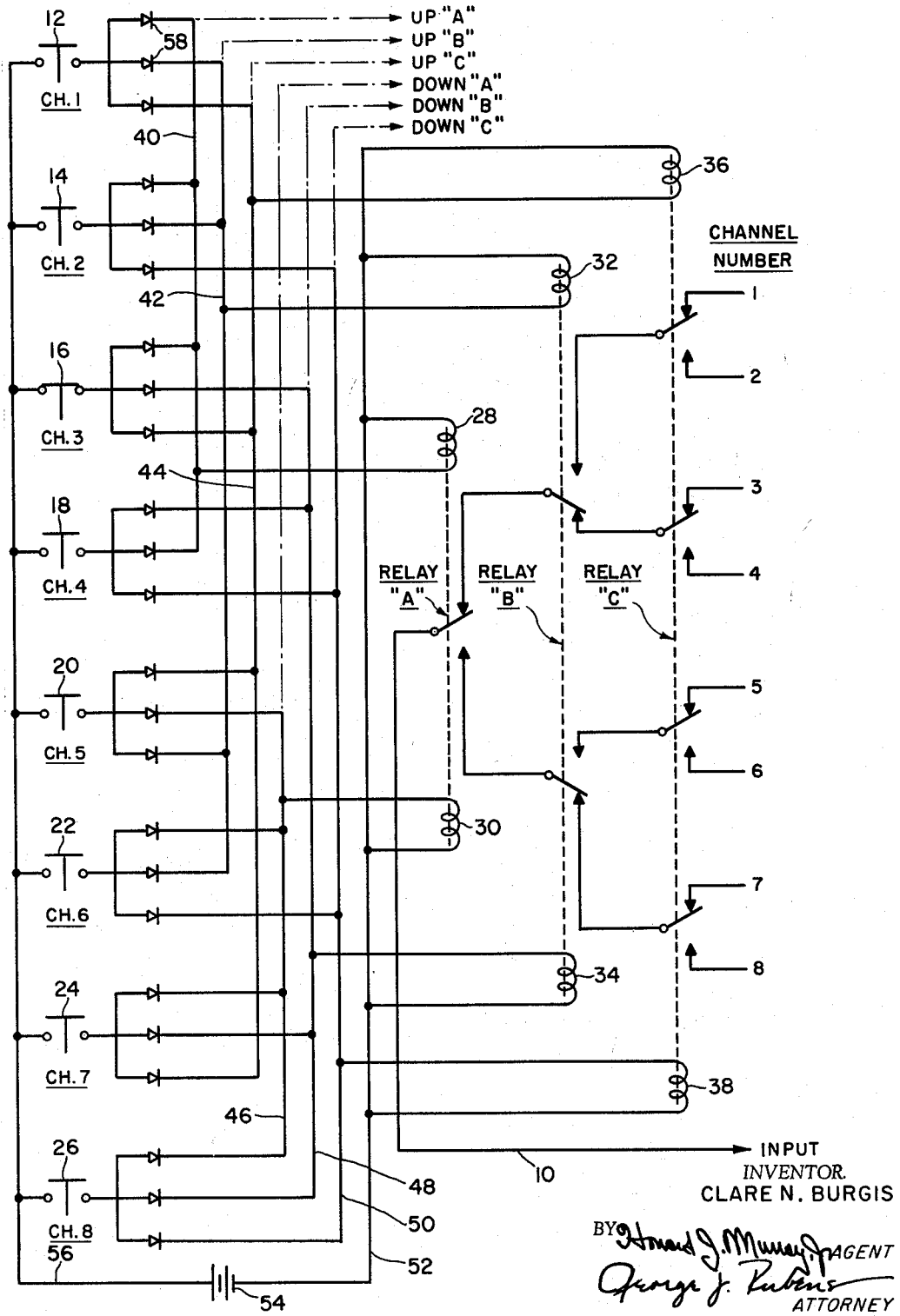

3,147,385
CASCADED RELAY CHANNEL SELECTING SYSTEM
Clare N. Burgis, Granada Hills, Calif., assignor, by mesne assignments, to the United States of America as represented by the Secretary of the Navy
Filed Apr. 10, 1963, Ser. No. 272,166
4 Claims. (Cl. 307—38)

The present invention relates to a manually-operable control system by means of which an input signal may be selectively channeled into any one of a plurality of output circuits.

The ability of a switching network to perform complex functions by means of relatively simple components is based upon the number of combinations into which these components of the circuit can be interrelated. For example, if a particular component can assume either of two circuit states, then two such elements in combination can indicate four states, three elements can indicate eight states, etc. Thus a relatively small number of units can be organized into a large number of unique combinations.

Certain types of multi-valued devices, such as a multi-terminal electro-magnetic switch, are useful for certain specialized applications in switching circuits. Although there may be a multiplicity of paths through the system, nevertheless, considered individually, each path is either open or closed during operation, and the system as a whole may be evaluated essentially on a two-condition basis. In this type of multi-functional network, there is a need for "connecting" circuits to associate functional parts for short periods of time, or to connect one or more circuit inputs to one or more circuit outputs. Many types of such connecting arrangements are known, with the differences therebetween usually depending upon the number of connectable circuits, the duration of the individual connections, and the number of leads required. Although the interconnecting paths of such a multi-functional system viewed as a whole may become highly complex, the control network for each individual component (such as a relay) forms a simple open or closed path which merely operates between two selective circuit states.

One widely used type of multi-terminal network is generally designated as a "transfer tree." In this arrangement, a single input may be connected to any one of X outputs according to the particular combination in which the relays actuating the network contacts are operated. For example, in a three-relay tree there are eight outputs, each output corresponding to a one of the eight possible combinations in which the three relays may be operated. One output only can be connected to the input at any particular time, and, because of the transfer-contact combinations, the outputs are completely isolated under all conditions. As well as being disjunctive, each path from the input to an output in a true transfer tree must pass through a contact on each controlling relay once and only once. Furthermore, because of the triangular symmetry of a fully-developed tree, there is a definite relationship between the number of controlling relays, the number of outputs, the maximum number of transfers on one relay, and the total number of transfers in the overall tree.

Although in many designs each relay of a transfer tree includes a single operating magnet to which the various contacts of the relay are ganged, there are certain situations in which it is desirable that each relay include a pair of magnets which may be selectively energized to control the positional status of the contacts. Under such circumstances, additional control circuits for the relay are required, and heretofore difficulty has been experienced in preventing undesired interaction between these various conductors when any one particular selector circuit is energized.

In accordance with a feature of the present invention, any one output channel of a multi-channel network may be selectively connected to a single input source by means of a so-called "transfer tree" in which each selector element or relay of the tree possesses two magnetic elements which are selectively energizable to cause the relay to assume one of its two possible circuit positions. These magnetic elements preferably are in the form of coils, and one terminal of each coil is connected to a common conductor leading to a source of operating potential. The remaining terminals of the coils are respectively connected to other conductors which may be individually energized by the closing of a selected one of a series of manually-operable switches the total number of which corresponds to the total number of output channels. To preclude interaction between various conductors to which the relay coils are connected, a plurality of diodes (or other unidirectional conducting devices) are interposed between the manually-operable switches and the conductors over which energy is selectively supplied to the relay coils. As a result of this arrangement, there is no "feedback" from one coil to another upon operation of a selected one of the manually-actuatable switches.

One object of the present invention, therefore, is to provide an improved multi-channel selecting system.

Another object of the invention is to provide a multi-channel selecting system including a series of relays each of which incorporates a number of selectively-energizable windings corresponding to the number of possible positions of the relay.

An additional object of the invention is to provide a multi-channel selecting system designed so as to preclude interaction between the various control circuits when any particular one of such circuits is selectively energized.

Other objects, advantages, and novel features of the invention will become apparent from the following detailed description of the invention when considered in conjunction with the accompanying drawings, the single figure of which is a schematic circuit digram of a preferred embodiment thereof.

In the illustrated embodiment of the present concept, a switching arrangement is provided whereby an input signal may be selectively conducted to any particular one of a plurality of output channels. For example, the signal or other data present in an input conductor 10 may be caused to appear in any selected one of eight output channels so identified and numbered in the drawing. This selective channelization of the input energy is brought about by manual manipulation of one of a series of eight push-button switches 12, 14, 16, 18, 20, 22, 24 and 26 respectively associated with the eight output channels. As illustrated, the switching arrangement of the circuit shown is composed of three relays connected in such a manner as to constitute a "transfer tree." Expressed differently, the initial relay A is made up of a single pair of stationary contacts, one of which is closed (or connected to the input) when the relay is in "up" position, and the other of which is "closed" when the relay is in "down" position, as viewed in the drawing. This relay A may therefore be described as being in effect a single-pole double-throw switch. The following relay B includes an additional pair of stationary contacts, and hence may be described as a double-pole, double-throw switch. Relay C, the terminal relay of the three illustrated, is a four-pole, double-throw switch.

Relay A is activated to an "up" position by energization of coil 28, and to "down" position by energization of coil 30. Relay B is activated to "up" position by energization of coil 32, and to "down" position by energization of coil 34. The two "up" and "down" coils for relay C are identified by the reference numbers 36 and 38, respectively.

Shown in the left-hand portion of the drawing are a plurality of bus wires 40, 42, 44, 46, 48, 50 and 52. The wire 52 is a common conductor connecting each of the coils 28, 30, 32, 34, 36 and 38 to the negative terminal of a source of potential 54. The positive terminal of this source 54 is connected to each of the push-buttons 12, 14, 16, 18, 22, 24 and 26 by means of a conductor 56.

In the arrangement shown, the manually-operable push-button 12 is associated with output channel 1—that is, closing of the circuit associated with button 12 causes the signal appearing in the input conductor 10 to be conveyed to output channel 1. In similar fashion, closing of push button 14 conveys the input data to channel 2, and so on. This mode of operation will become clear when it is recognized that the coil 28 is connected to conductor 40, and hence the latter is the conductor which is energized to cause relay A to assume its "up" position. For simplification of description, therefore, conductor 40 may be designated the "up A" conductor. When it is desired to energize coil 30 (which causes relay A to assume its "down" position) the conductor 46 is energized, and hence the latter may be termed the "down A" conductor. Since coils 32 and 34 are respectively connected to the bus wires 42 and 48, these two conductors may be termed the "up B" and "down B" conductors, respectively. In similar fashion, the remaining conductors 44 and 50 control the up and down positions of relay C.

In the drawing, the push button 16 has been shown in closed or actuated position. When this push button 16 is so actuated, a circuit is completed from the potential source 54 over the conductor 56 and push button 16 to the three conductors 40, 48 and 44. Energization of conductor 40 causes current to flow through coil 28 and brings relay A to its "up" position. Flow of current through conductor 48 energizes coil 34 and brings relay B to its "down" position. Simultaneous energization of conductor 44 energizes coil 36 and brings relay C to its "up" position, as illustrated. As a result, a path is established for the input data arriving over conductor 10 through the closed contacts of relays A, B and C to output channel 3. It will be seen from the drawing that current flows only to output channel 3, and that no other channels can be energized. Selective operation of the relays A, B and C upon manual actuation of any of the other switches 12, 14 and 18 through 26 will convey input data only to the one particular output channel associated with the push button so manipulated.

It will be seen that only three of the conductors 40 through 50 are energized at any one instant of time. In order to preclude energy from feeding back from these three energized conductors to the remaining bus wires through the common connections established at the push button switches, each output lead from each of the push button switches has incorporated therein a unidirectional circuit element 58, such, for example, as a diode through which current can flow only in the desired direction, and which acts to preclude current from an energized conductor from interacting with the remaining unenergized conductors to result in an unwanted energization of the relay coils 28 through 38 and possible erroneous or ambiguous operation of the selecting system.

Although eight output channels have been illustrated and described as constituting one embodiment of applicant's invention, the concept is obviously not limited to any particular number of output paths. It is only necessary that each succeeding one of the cascaded relays have a number of movable contacts equal to the number of stationary contacts possessed by the preceding relay. In practice, as many as thirty-two stationary contacts (providing thirty-two output channels) have been incorporated into a single relay, and even more are possible with proper design of the armature assembly.

Obviously many modifications and variations of the present invention are possible in the light of the above teachings. It is therefore to be understood that within the scope of the appended claims the invention may be practiced otherwise than as specifically described.

I claim:

1. In a control system by means of which an input signal may be selectively channeled into a particular one of a plurality of output circuits, the combination of:
   (a) a plurality of relays connected in cascaded relation, the initial one of said relays being in the form of a single-pole, double-throw switch consisting of a movable contact adapted to receive said input signal and a pair of stationary contacts selectively engaged by said movable contact, each succeeding relay having a number of movable contacts equal to the number of stationary contacts of the preceding relay, each relay also incorporating a pair of windings and an armature associated with the movable contact of the relay, which armature is movable in one of two directions, according to which of the two relay windings is energized, to actuate said movable contact so that the latter will electrically engage one of its two associated stationary contacts, the number of output channels of the system thus being equal in number to the number of stationary contacts associated with the terminal one of the said cascaded relays,
   (b) a plurality of manually-actuatable switches equal in number to the number of output channels of said system,
   (c) a source of potential,
   (d) circuit means responsive to the closing of a selected one of said manually-actuatable switches to energize one of the two windings associated with each of the said cascaded relays to cause each movable contact of each relay to electrically engage one of the two stationary contacts associated therewith and thereby close a circuit path for said input signal through each of said relays to the output channel corresponding to the particular switch so manually actuated,
   (e) and a plurality of unidirectional circuit elements interposed between each manually-actuatable switch and one winding of each relay to which such switch is connected,
   (f) whereby, upon manual closing of a particular switch, energy passing through said unidirectional elements to energize the relay windings associated therewith is precluded from passing through the unidirectional elements associated with the remainder of said manually-actuatable switches in a reverse direction, such a reverse passage of energy, when permitted to occur, resulting in an unwanted energization of one or more of the remaining relay windings to cause an ambiguity in the operation of said control system.

2. The combination of claim 1 in which said unidirectional circuit elements are diodes.

3. The combination of claim 1 in which the number of diodes associated with each manually-actuatable switch is equal to the number of relays incorporated in said system, each diode conducting energy, upon a closing of its associated switch, to one of the two windings with which each relay is provided.

4. A control system according to claim 1, said system including a plurality of bus wires, the number of such bus wires being twice the number of cascaded relays present in said system, with two of said bus wires being associated with each relay, one of the two bus wires for each relay being associated with one of the relay windings and the other of said bus wires being associated with the remaining relay winding, with a particular manually-actuatable switch being connected to a number of the said bus wires equal to the number of relays through a number of the said unidirectional circuit elements likewise equal to the number of said relays, each manually-actuatable switch being connected to a different combination of bus wires to thereby result, upon closing of a particular one of said manually-actuatable switches, in a particular energization of the relay windings which is different from that particular energization of the relay windings which results upon the closing of any other one of said manually-actuatable switches.

No references cited.